(No Model.)
S. S. GERRY.
SHIP'S WINDLASS SELF REGISTER.
No. 508,935. Patented Nov. 21, 1893.
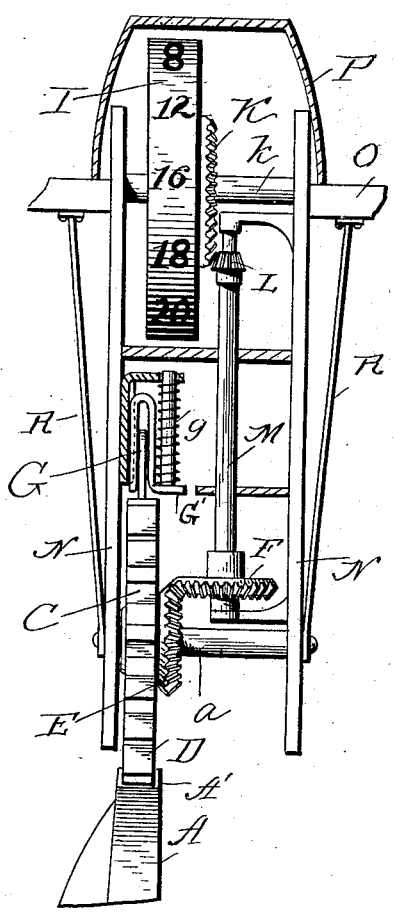
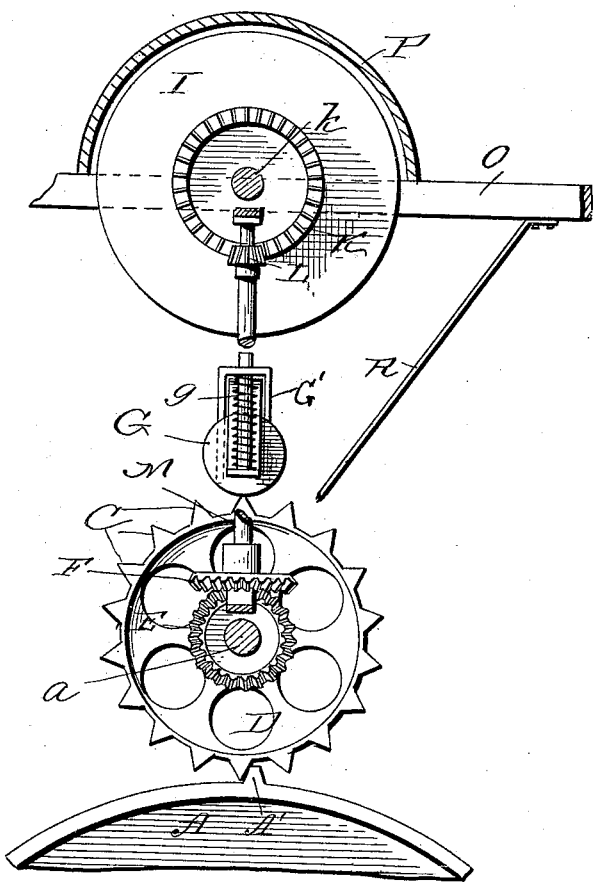

UNITED STATES PATENT OFFICE.

SETH S. GERRY, OF THOMASTON, MAINE.

SHIP'S WINDLASS SELF-REGISTER.

SPECIFICATION forming part of Letters Patent No. 508,935, dated November 21, 1893.

Application filed March 14, 1892. Serial No. 424,922. (No model.)

*To all whom it may concern:*

Be it known that I, SETH S. GERRY, a citizen of the United States, residing at Thomaston, in the county of Knox and State of Maine, have invented an Improvement in Ships' Windlass Self-Registers; and I hereby declare the following to be a full, clear, and exact description of the same.

My invention is an improved registering attachment for ships' windlasses, the object of the invention being to provide an attachment by means of which the amount of cable paid out may be readily and accurately determined.

I have illustrated my invention in the accompanying drawings, in which—

Figure 1, is a side elevation of my device as applied to a windlass, and Fig. 2, is a view taken at right angles to Fig. 1.

The device when in position is secured to the deck of the vessel and by suitable braces from the under side, the upper part protruding through the deck and the lower part or end extending in proximity to the top of the wild cat.

In the drawings a portion of the deck of a vessel is represented at O, and the upper part of the wild cat of an ordinary ship's windlass at A, this windlass and wild cat being of the ordinary and well known construction and, of course, needing no further description herein.

The wild cat carries one or more teeth or projections as A' by means of which motion is imparted to the wheel D. This wheel is mounted upon a shaft $a$ journaled in suitable supports N depending from the deck, which supports are preferably braced by stay rods R, as shown.

The wheel D carries a series of teeth or projections C designed to be engaged by the tooth or teeth on the wild cat. The shaft, $a$, also carries a bevel gear wheel E rigidly secured thereon which engages with a horizontal bevel gear wheel F rigidly mounted on the vertically journaled shaft M, near the upper end of which is mounted another horizontal bevel gear wheel L which engages with the bevel gear K mounted on shaft $k$. This shaft $k$ also carries a registering wheel or disk I which projects above the deck, and is provided with suitable indicating devices or numbers by means of which the amount of cable paid out may be determined at a glance as the motion caused by the engagement of the tooth on the wild cat with the teeth of the wheel D will be transmitted through the gearing to the registering wheel.

It will be readily understood that as the cable is paid out the registering wheel will be turned to indicate the number of fathoms paid out, and as it is drawn in the reverse movement of the parts takes place, but the amount of cable freed from the windlass may at any time be readily determined.

I find it desirable to provide a means for regulating the movement of the registering wheel and preventing accidental displacement or movement in the intervals between the times when the tooth of the wild cat engaged the teeth of wheel D. For this purpose I provide the wheel G mounted in yielding or sliding bearings G' and held normally toward or in contact with wheel D by the helical spring $g$. This wheel G will thus rest normally between two of the teeth of the wheel D as shown in Fig. 1, but when said wheel D is rotated one step by the tooth on the wild cat the wheel G will yield in its bearings to permit one tooth to pass by, returning to rest between the next two teeth and preventing any accidental movement.

As a protection to the registering wheel, I place over it upon the deck a cap P which rises about six inches above the deck upon which it is secured, and hence is not an obstacle. In the top of the cap is located a slide by means of which it can be opened to view the indicator wheel.

I claim as my invention—

In combination with the windlass having a projection thereon, a toothed wheel rotated step by step by said projection, a wheel or disk supported in yielding bearings and resting normally between two of the teeth of the toothed wheel, a register, and connections from the toothed wheel to said register, substantially as described.

In witness whereof I have hereunto set my hand.

SETH S. GERRY.

Witnesses:
 EDWARD BROWN,
 R. M. LAWRY.